Dec. 1, 1964      E. B. DAHLIN      3,159,741

LOW NOISE ELECTRONIC DIFFERENTIATOR

Filed March 27, 1959

*INVENTOR.*
ERIK B. DAHLIN

BY Arthur H. Swanson

ATTORNEY.

United States Patent Office 3,159,741
Patented Dec. 1, 1964

3,159,741
LOW NOISE ELECTRONIC DIFFERENTIATOR
Erik B. Dahlin, Philadelphia, Pa., assignor to Honeywell Inc., a corporation of Delaware
Filed Mar. 27, 1959, Ser. No. 802,324
5 Claims. (Cl. 235—183)

The present invention relates to electrical apparatus and more particularly to electrical differentiating devices.

More specifically, the present invention relates to an electrical differentiating device using an electrical integrating circuit.

An object of the present invention is to provide an improved electrical differentiating device.

Another object of the present invention is to provide an improved electrical differentiating device which is characterized by the ability to respond to a very slowly varying input signal.

A further object of the present invention is to provide an improved electrical differentiating device which is characterized by the ability to obviate the effects of step variations in a slowly varying input signal.

A still further object of the present invention is to provide an improved electrical differentiating device, as set forth, having a simplified operation and construction.

In accomplishing these and other objects, there has been provided, in accordance with the present invention, an electrical differentiating circuit having therein an electrical integrating means. A varying input signal is compared with a reference signal to produce a difference signal, representing the rate of change of the condition of the input signal. This difference signal is applied as an input signal to a first so-called operational amplifier. The reference signal is generated by an integrating means in a feedback loop around the operational amplifier which integrates an output signal of the aforesaid operational amplifier. The output signal of the first operational amplifier is also amplified by another operational amplifier to form the output signal of the differentiating circuit.

A better understanding of the present invention may be had from the following detailed description when read in connection with the accompanying drawings, in which.

Figure 1:
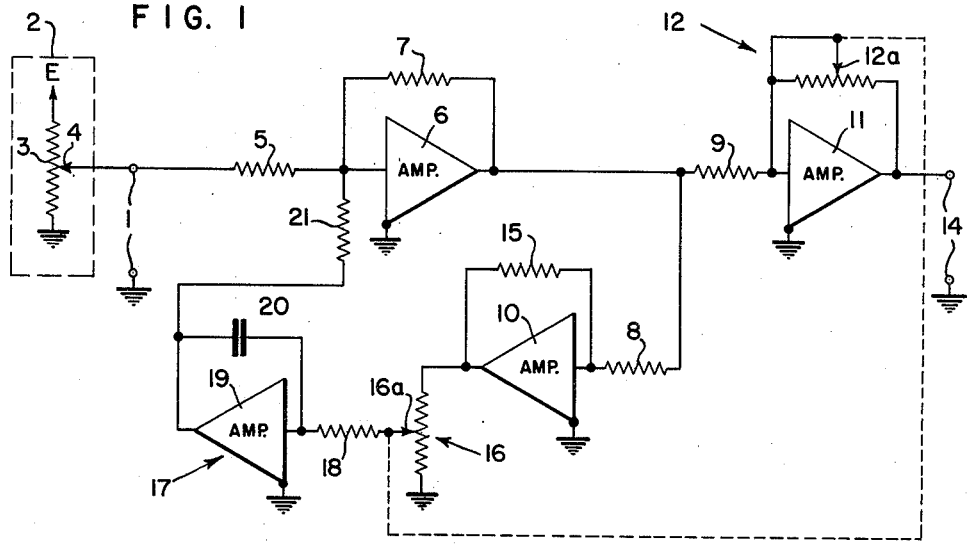
FIG. 1 is a schematic representation of a differentiating device embodying the present invention.

Referring to FIG. 1 in more detail, there is shown a differentiating device having a pair of input terminals 1 for connection to an output signal from a signal source 2. As shown in FIG. 1, the signal source 2 may be a slide-wire having a resistive element 3 and a slider 4. A voltage E is impressed across the resistive element 3 with a portion of this voltage appearing at the slider 4. Thus, the movement of the slider 4 is effective to vary the voltage appearing thereon. This voltage variation may represent a variation in a monitored variable; e.g., temperature, by mean of suitable monitoring devices. The rate of change, or derivative, of this voltage variation represents the rate of change of the condition of the monitored variable.

The output signal from the signal source 2 is connected through the input terminals 1 to an input resistor 5 of a first amplifier 6 having a feedback resistor 7. This amplifier may be of a type known in the art as an operational amplifier. The output signal from the first amplifier 6 is simultaneously connected to the input resistors 8, 9 of a second and a third operational amplifier 10, 11, respectively.

A rheostat 12 with a slider 12a is arranged as the feedback resistor of the third amplifier 11. The output signal from the third amplifier 11 is connected to a pair of output terminals 14 to represent the output signal of the device of the present invention.

The second operational amplifier 10 has a feedback resistor 15 corresponding to the feedback resistor 7 of the first amplifier 6. The output signal from the second amplifier 10 is connected to a potentiometer 16 having a slider 16a. This last-mentioned slider 16a is mechanically connected to the slider 12a of the rheostat 12 to effect a simultaneous motion of both elements in a pre-arranged relationship. The output signal appearing on the slider 16a of the potentiometer 16 is connected as an input signal to an electronic integrator 17. The integrator 17 includes an input resistor 18, an operational amplifier 19 and a feedback capacitor 20 connected across this amplifier.

The operation of the integrator 17 is well-known in the art as described on page 138 of "Electronic Analog Computers" by Korn and Korn, published by McGraw-Hill in 1952.

Briefly, the integrator 17 integrates an input signal by accumulating a charge on the feedback capacitor 20 to represent a summation of the input signal during a period of time. The operational amplifier 19 is used to linearize the charging operation of the feedback capacitor 20 and to obviate, partially, the opposition of the accumulated charge with respect to the input signal.

The output signal of the integrator 17 is applied through an isolating resistor 21 to the first operational amplifier 6 in parallel with the input signal from the signal source 2. The mode of operation of the present invention follows:

Assume the output signal from the signal source 2 is a constant value and the feedback capacitor 20 is initially uncharged. The output signal from the signal source 2 is applied to the first operational amplifier 6 through the input terminals 1. The operational amplifiers 6, 10 and 11 are each arranged to have an odd number of amplifying stages to produce an output signal having an opposite polarity to that of a corresponding input signal.

Thus, the first operational amplifier 6 is effective to produce an output signal which is of an opposite polarity with respect to the output signal from the signal source 2. This output signal is simultaneously applied to the second amplifier 10 and the third amplifier 11. As in the case of the first amplifier 6, the second amplifier 10 produces an output signal which has an opposite polarity with respect to the input signal thereto. The output signal from the second amplifier 10 is applied across the potentiometer 16. A portion of this output signal, as determined by the position of the slider 16a is applied to the integrator 17. The position of the slider 16a is determined by the expecetd approximate rate of change of the output signal from the test signal source 2, as explained hereinafter.

As previously discussed, the integrator 17 produces an output signal whhich is an accumulation, or integration, of the input signal applied thereto. This integrator output signal is applied to the first amplifier 6 in parallel with the output signal from the signal source 2. Further, the integrator output signal is arranged to subtract from the output signal from the signal source 2. Accordingly, the resulting difference input signal to the first amplifier 6 is rapidly reduced to a zero amplitude by the increasing output signal from the integrator 17. This decrease of the input signal to the first amplifier 6 is effective to reduce the output signal from the first amplifier 6 as applied to the second and third amplifiers 10 and 11. The input signal of the integrator 17, therefore, is reduced to a zero amplitude as the amplitude of the output signal there-from approaches the amplitude of the output signal from the source 2.

The final condition in the case of a constant signal from the source 2 is represented by an output signal from the integrator 17 equal in amplitude to the aforesaid constant signal from the source 2. This output signal is retained by the integrator 17 and is effective to apply a zero amplitude input signal to the first amplifier 6 and, thereby, to apply a zero amplitude input signal to the second and third amplifiers 10 and 11.

As previously mentioned, the output signal from the first amplifier 6 is also applied to the third amplifier 11. The output signal from the third amplifier 11 appears at the output terminals 14 as a representation of the rate of change of the output signal from the source 2. This output signal on the output terminals 14 has an initial transient amplitude which reaches a zero amplitude after the final condition is reacted by the integrator 17. The zero amplitude signal on the output terminals 13 is a derivative of the output signal from the source 2 since the derivative of a constant quantity is zero.

In the case of an output signal from the source 2 which is varying at some rate, the input to the first amplifier 6 is the difference between this varying output signal and the output signal from the integrator 17. As previously discussed in the case of a constant output signal from the source 2, the difference input signal to the first amplifier 6 is effective to produce an input signal to the integrator 17 and to the third amplifier 11. The third amplifier 11 is effective to amplify this difference signal to produce a corresponding output signal on the output terminals 14.

The integrator 17 produces an increasing output signal in an attempt to reduce this difference signal to a zero amplitude. Assuming the output signal from the test source 2 is increasing at a constant rate, the difference signal will assume a constant value as the increasing output signal from the integrator 17 lags the increasing output signal by a fixed value. Accordingly, the output signal from the third amplifier 11 appearing at the output terminals 14 is the derivative of the output signal from the source 2.

If the rate of change of the output signal from the source 2 increases or decreases, the difference signal to the first amplifier 6 increases or decreases, correspondingly. For example, if the rate of change of the input signal increases, the difference signal at the input of the first amplifier 6 is increased. This increased signal is, subsequently, applied to the third amplifier 11 which is effective to increase the output signal at the output terminals 14. Also, the increased signal is applied through the second amplifier 10 to the integrator 17. The integrator 17 increases the rate of change of its output signal in proportion to the increased input signal thereto. However, this increased output signal is only effective to maintain the new difference signal representing the lag of the output signal from the integrator 17. Thus, the increase of the output signal at the output terminals 14 remains to indicate an increase in the derivative of the output signal from the source 2.

If the variation of the output signal from the source 2 is stopped at some constant signal value, the difference signal and the resulting output signal are reduced to a zero amplitude to represent a derivative of zero, as previously discussed. It is obvious that a reversal in the rate of change; i.e., a decrease of the output signal from the source 2 is effective to decrease the output signal from the integrator 17. Since the reversal of the output signal involves a momentary pause of constant value, the derivative signal at the output terminals 14 assumes a momentary zero value. The subsequent decrease of the output signal is effective to produce a difference signal which results in a decrease of the integrator output signal by means of a discharge of the feedback capacitor 20. As is the case of the increasing output signal from the source 2, the integrator output signal lags the source output signal by the value of the difference signal at the first amplifier 6. This difference signal, however, has a reversed polarity with respect to the difference signal representing an increasing source output signal since the decreasing source output signal has a lower amplitude than the integrator output signal. The resulting derivative output signal appearing at the output terminals 14, therefore, has an opposite polarity with respect to the derivative of the increasing source output signal. For example, if the derivative output signal at the output terminals 14 is positive when the source output signal is increasing, then the derivative output signal is negative when the source output signal is decreasing.

The increase or decrease of the output signal from the integrator 17 is limited by the time constant of the charging circuit for the feedback capacitor 20 and the amplitude of the integrator input signal. The rate of variation of the integrator output signal is, thus, directly affected by the position of the slider 16a which determines the portion of output signal of the second amplifier 10 applied to the integrator 17. The slider 12a of the feedback rheostat 12 is effective to determine the gain of the amplifier 11 thereby determining the amplitude of the derivative output signal at the output terminals 14. The potentiometer 16 and the rheostat 12 are ganged for simultaneous operation to retain the derivative output signal at a preset value regardless of any desired variation of the input signal to the integrator 17 by the potentiometer 16.

The integrator input signal is adjusted to allow the device of the present invention to differentiate extremely slowly-varying source signals having unwanted short intervals of high rates of changes. Such a source signal may be obtained from a wire-wound slidewire having a slider. The slow movement of the slider varies the voltage thereon in a series of steps produced by the slider passing from one turn of the coil of wire to the next. Since such steps do not represent the desired rate of change of the source signal, the slider 16a of the potentiometer 16 is set to a point which applies a small portion of the total signal across the potentiometer 16 to the integrator 17. The difference signal at the first amplifier 6 is increased thereby as a result of a decrease in the charging of the feedback capacitor 20 which produces a greater lag of the integrator output signal behind the test output signal. On the other hand, the slow charging rate of the integrator 17 is effective to prevent any response thereof to rapidly changing input signals. The difference signal, consequently, represents the rate of change of the average of the test signal without regard to any short step changes. However, the derivative output signal is retained at a preset value by a simultaneous decrease in gain of the third amplifier 11 by means of the feedback rheostat 12.

Figure 2:
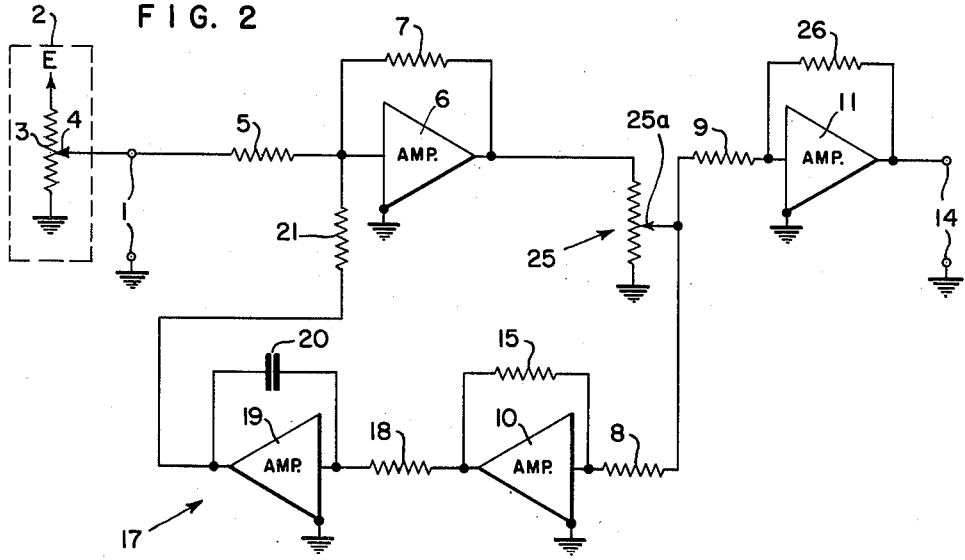
FIG. 2 is a schematic representation of somewhat different structure for the device shown in FIG. 1.

In FIG. 2, there is shown a somewhat different structure for the device shown in FIG. 1. In FIG. 2, the functions of the rheostat 12 and the potentiometer 16, shown in FIG. 1, are combined and performed by one unit, a feedback potentiometer 25, having a slider 25a. This slider 25a is connected to the input circuit of the amplifier 11. The rheostat 12 is replaced by a fixed feedback resistor 26, and the potentiometer 16 is replaced by a direct connection between the second amplifier 10 and the integrator 17.

As previously discussed with relation to FIG. 1, a decrease in the signal applied to the integrator 17 necessitated a decrease in the overall gain of the third amplifier 11 to maintain a constant derivative output signal. This operation is performed by the signal feedback potentiometer 25, e.g., a movement of the slider 25a to decrease the signal applied to the integrator 17 is also effective to decrease the signal applied to the third amplifier 11. Consequently, the resulting increase in the difference signal does not increase the derivative output signal. The operation of the circuit shown in FIG. 2 is similar to that described above with respect to FIG. 1.

Thus, it may be seen that there has been provided, in accordance with the present invention, a differentiating device utilizing an integrator, which is characterized by the ability to respond to slowly varying input signals without responding to step variations therein.

What is claimed is:

1. A differentiating device comprising, in combination, a first operational amplifier, a second operational amplifier, an electronic integrator, a negative feedback circuit connected around said first amplifier, said feedback circuit including a serial connection of said second amplifier and said integrator, a pair of input terminals for connecting to a source of input signals, means for connecting an ouput signal from said integrator in opposition to said input signals to form a difference signal as an input signal to said first amplifier, a third operational amplifier, means for connecting an output from said first amplifier as an input signal to said third amplifier, a pair of output terminals, means for connecting an output signal from said third amplifier to said output terminals, and means for simultaneously varying said output signal from said third amplifier and an output signal from said second amplifier.

2. A differentiating device comprising, in combination, a first operational amplifier, a second operational amplifier, an electronic integrator, a negative feedback circuit connected around said first amplifier, said negative feedback circuit including a serial connection of said second amplifier and said integrator, said second amplifier including potentiometer means connecting an output signal from said second amplifier as an input signal to said integrator, a pair of input terminals for connection to a source of input signals, means for connecting an output signal from said integrator in opposition to said input signals to form a difference signal as an input signal to said first amplifier, a third operational amplifier, said third amplifier including means for varying an output signal from said third amplifier, means connecting said last mentioned means with said potentiometer means for simultaneous operation therewith, means for connecting an output signal from said first amplifier as an input signal to said third amplifier, a pair of output terminals, and means for connecting said output signal from said third amplifier to said output terminals.

3. A differentiating device comprising, in combination, a first operational amplifier, a second operational amplifier, a third operational amplifier, potentiometer means for connecting an output signal from said first amplifier as an input signal to said second and said third operational amplifiers, a pair of output terminals, means for connecting an output signal from said third amplifier to said ouput terminals, an electronic integrator, said integrator being responsive to an output signal from said second amplifier, a pair of input terminals for connection to a source of input signals, and means for connecting an output signal from said integrator in a subtractive relationship with said input signals to form an input signal for said first amplifier.

4. A differentiating device comprising, in combination, a first operational amplifier, a second operational amplifier, an electronic integrator, said integrator including an integrator operational amplifier, an input resistor for said integrator operational amplifier and a feedback capacitor connected in a feedback loop around said integrator operational amplifier, a negative feedback circuit connected around said first amplifier, said feedback circuit including a serial connection of said second amplifier and said integrator, a pair of input terminals for connection to a source of input signals, means for connecting an output signal from said integrator in opposition to said input signals to form a difference signal as an input signal to said first amplifier, a third operational amplifier, means for connecting an output signal from said first amplifier as an input signal to said third amplifier, a pair of output terminals, means for connecting an ouput signal from said third amplifier to said ouput terminals, and means for simultaneously varying said output signal from said third amplifier and an output signal from said second amplifier.

5. A differentiating device comprising, in combination, a first operational amplifier, a second operational amplifier, an electronic integrator, a negative feedback circuit connected around said first amplifier, said negative feedback circuit including a serial connection of said second amplifier and said integrator, said second amplifier including potentiometer means for connecting an output signal from said second amplifier as an input signal to said integrator, a pair of input terminals for connection to a source of input signals, means for connecting an output signal from said integrator in opposition to said input signals to form a difference signal as an input signal to said first amplifier, a third operational amplifier, said third amplifier including a rheostat connected in a negative feedback loop around said third amplifier for varying an output signal from said third amplifier, means for connecting said rheostat with said potentiometer means for simultaneous operation therewith, means for connecting an output signal from said first amplifier as an input signal to said third amplifier, a pair of output terminals, and means for connecting said output signal from said third amplifier to said output terminals.

References Cited in the file of this patent

UNITED STATES PATENTS

| 2,457,214 | Doll et al. | Dec. 28, 1948 |
| 2,464,708 | Moseley | Mar. 15, 1949 |

OTHER REFERENCES

Lakatos: Problem Solving With the Analog Computer, Bell Lab., March 1951, pages 110, 111.

Johnson: Analog Computer Techniques, McGraw-Hill Co., 1956, page 97, article 6–4.

Fogiel: Instruments and Automation, vol. 31, No. 9, September 1958. Page 1525.